Dec. 31, 1957  E. T. CONAWAY  2,817,874
APPARATUS FOR SUPPORTING BIRDS AND THEIR VISCERA
FOR INSPECTION AND/OR PROCESSING
Filed Sept. 8, 1955  2 Sheets-Sheet 1
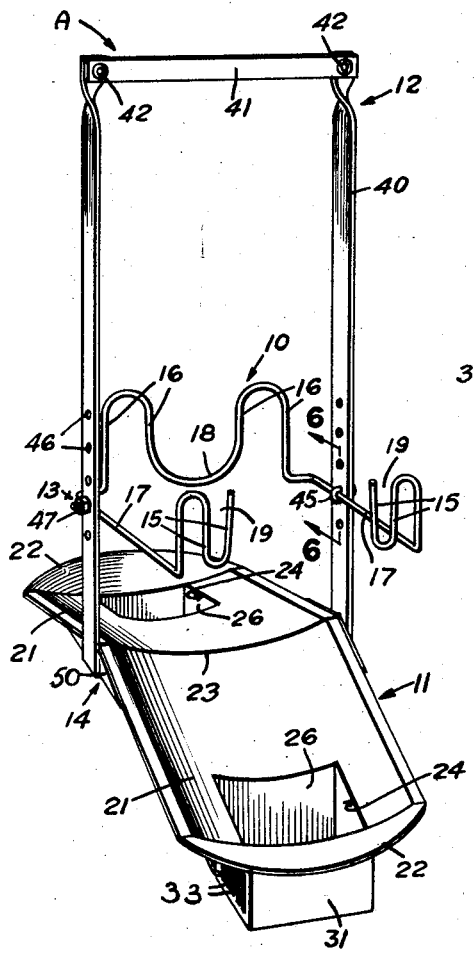
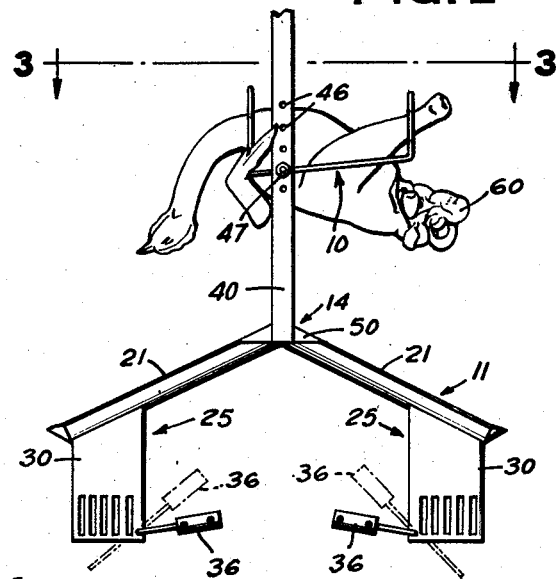
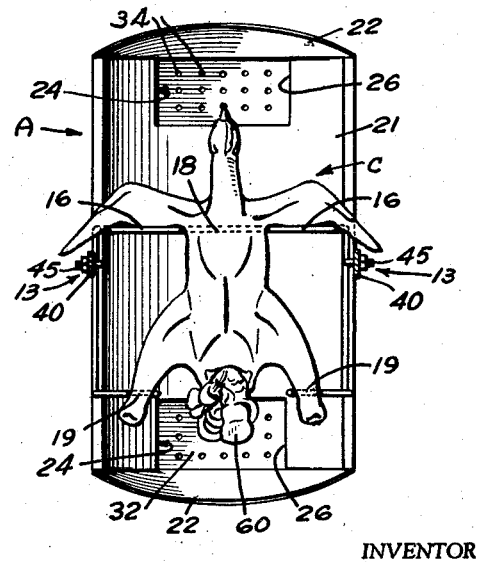
INVENTOR
Everett T. Conaway
BY
ATTORNEYS Dec. 31, 1957 E. T. CONAWAY 2,817,874
APPARATUS FOR SUPPORTING BIRDS AND THEIR VISCERA
FOR INSPECTION AND/OR PROCESSING
Filed Sept. 8, 1955 2 Sheets-Sheet 2
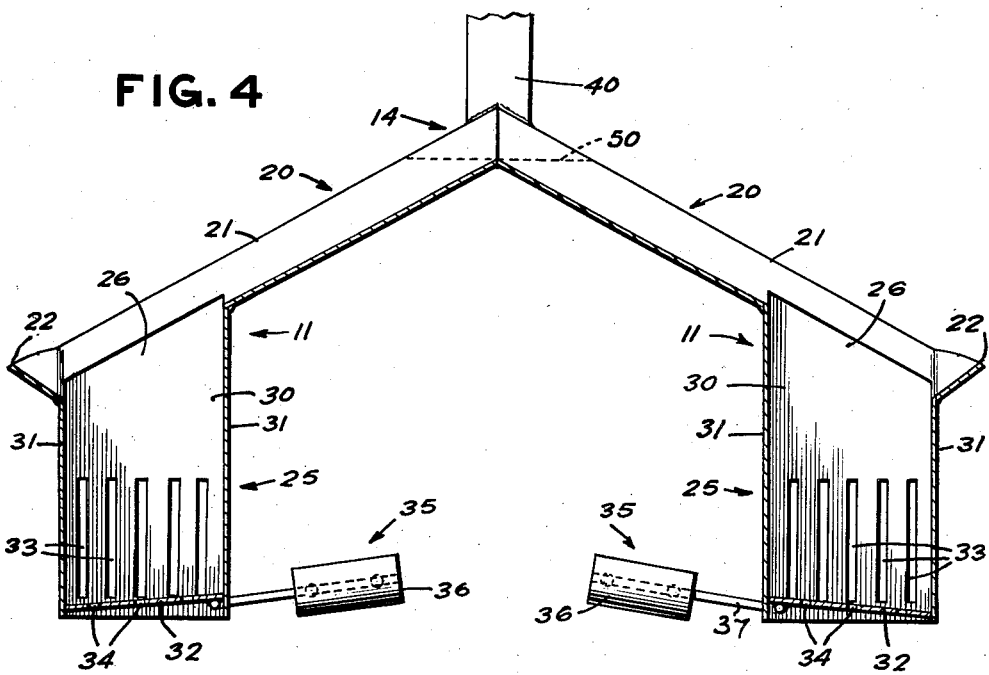
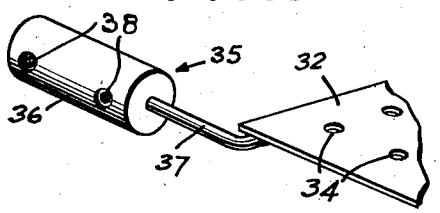
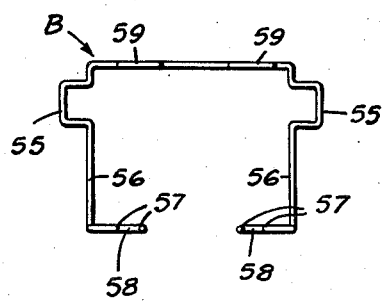
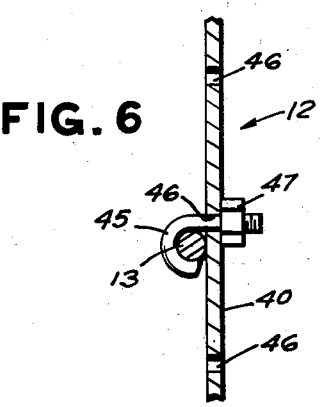
INVENTOR
Everett T. Conaway
BY
ATTORNEYS United States Patent Office 2,817,874
Patented Dec. 31, 1957

2,817,874

APPARATUS FOR SUPPORTING BIRDS AND THEIR VISCERA FOR INSPECTION AND/OR PROCESSING

Everett T. Conaway, Salisbury, Md.

Application September 8, 1955, Serial No. 533,086

6 Claims. (Cl. 17—44.1)

This invention relates to apparatus for supporting birds and their viscera for inspection and/or processing. Such processing may include the steps of dressing, with inspection of the birds during dressing.

An important object of the invention is to provide an apparatus for supporting birds above a viscera-receiving means in most convenient positions for rapid and sanitary processing, as employed in modern processing plants, with inspection of the exposed viscera while it is still attached to the birds.

Another important object is to provide an apparatus for supporting birds, in positions inclined from the vertical, for processing, with their wings supported outspread and supported in a manner to prevent damage thereto, their bodies substantially free of the support means, and their legs rigidly supported at the hock joints in such manner that the birds will not become displaced during processing and inspection.

Additionally, an important object is to provide an apparatus for positioning a bird in a substantially horizontal position for processing, which renders processing from either end of the bird convenient, particularly since the bird is positioned over a viscera-receiving means which includes a separate compartment for receiving non-edible viscera (offal) and a separate compartment for receiving edible viscera (giblets).

In addition, an important object is to provide apparatus as described above in which means is provided for discharging the contents of the compartments, without handling the contents, for preventing the accidental discharge of the offal into the wrong compartment, and for complete sterilization of the viscera-receiving means.

Moreover, an important object is to provide means for adjusting the relative positions of the bird-supporting means and viscera-receiving means so that the former may be brought closer to the latter and vice versa.

Additionally, an important object is to provide a plurality of bird-supporting means of different areas, whereby birds of different sizes may be supported by the apparatus.

Other objects and advantages of the invention will be apparent during the course of the following detailed description of the invention, taken in connection with the accompanying drawings, forming portions of this disclosure, and in which drawings:

Fig. 1 is a perspective view of the apparatus showing one embodiment of a bird-supporting means.

Fig. 2 is a fragmentary side elevation of the apparatus showing a bird supported thereby.

Fig. 3 is a horizontal section substantially on the line 3—3 of Fig. 2.

Fig. 4 is a longitudinal vertical section, on an enlarged scale, of the lower portion of the apparatus.

Fig. 5 is a fragmentary perspective view of a counterbalance means associated with the lower portion of the apparatus.

Fig. 6 is a vertical section substantially on the line 6—6 of Fig. 1, but on a scale enlarged over that of Fig. 1.

Fig. 7 is a top plan of a modification of the bird-supporting means of Fig. 1.

In the drawings, wherein for the purpose of illustration are shown a preferred embodiment of the invention and a modification of a portion thereof, the letter A designates the apparatus, B a modification of a portion thereof and C a bird supported by the apparatus.

The apparatus A comprises bird-supporting means 10, viscera-supporting means 11, carrying means 12, means 13 for adjustably supporting the means 10 upon the carrying means 12, and means 14 securing the means 12 to the means 11.

Referring mainly to Fig. 1, the bird supporting means 10 comprises a frame which includes two spaced-apart leg-supporting portions 15, two spaced-apart wing-abutting portions 16, two spaced-apart carrying means attached portions 17, one of each of the three portions being disposed on one side of the frame and interconnected and the other of each of the three portions being disposed on the other side of the frame and interconnected, with a back-supporting portion 18 joining the portions 16. Each leg-supporting portion is provided with an upwardly-opening notch or recess 19.

Referring now to the viscera-supporting means 11, the same includes an uppermost or tray portion 20 comprising two upwardly-converging elements 21, which may be plates of rigid metal, preferably dished at their side parts and also dished at their outer (or lowermost) end parts with the edges 22 of the outer end parts preferably curved longitudinally. The crest 23 at the juncture of the two upwardly-converging elements forms a division line whereby material dropping upon either element 21 will find its way by gravity to an opening 24 in each element and to a well or compartment 26 extending below each element 21 and communicating with an opening 24. As may be seen particularly in Fig. 4, each opening and well is located close to the outermost end edge 22 and remote from the crest 23. One well or compartment 26 may be termed the offal-receiving compartment and the other may be termed the giblet-containing compartment. Preferably at least the upper surfaces of the elements 21 are smooth and at least the upper surface portions of corrosion-resistant material.

Each well or compartment 26 preferably has end walls 30 and side walls 31 secured in any approved way, as by welding, to the elements 21, and a movable bottom wall 32. Suitable openings may be provided in at least some of these walls, such as openings 33 in the walls 30 which are preferably vertically-extending slots, and openings 34 in the bottom walls, such as spaced-apart perforations.

Preferably, the movable bottom walls 32 are pivoted to swing downwardly from bottom-closing positions as may be apreciated from the dotted line positions in Fig. 2. They may be pivoted to the walls 30 adjacent their rearward ends.

Counterbalance means 35 for the bottom walls 32 may comprise a weight 36 and substantially L-shaped arm 37 carried by each wall 32 as may be seen in Fig. 5. The weights 36 may be tubular bodies with free end portions of the arms 37 extending thereinto. In order to adjust the counterbalancing effect, the weights may be adjusted along the arms 37, and I prefer to retain them in adjusted positions by means of set screws 38 extending radially through the tubular bodies to engage the arms 37. The counterbalancing means is provided so that the bottom walls 32 may not swing downwardly under the weight of either the offal or giblets deposited therein, but a slight additional weight or downward force will cause the walls to pivot downwardly to discharge the contents.

The carrying means 12 is shown as a pair of upwardly-extending members 40, which may be rigid metallic straps or arms, joined at their upper end portions by a cross member 41 preferably of the same material as that of the members 40. Openings 42 may be provided in the means 12 for receiving conventional fastener means (not shown) for securing the apparatus A to a conveyor (not shown). Such openings may be formed by grommets extending through the upper end portions of the members 40 and outer end portions of the member 41.

Means 13 for adjustably supporting the means 10 upon the carrying means 12 preferably comprises the structure shown in Fig. 6 where the curved portion of a J-bolt 45 embraces a part of a carrying means attached portion 17 clamped against a member 40 and the screw-threaded end portion of the bolt extending through any one of a plurality of spaced-apart perforations or openings 46 in the member 40. A suitable nut 47 is provided for the bolt. This permits ready adjustment of the means 10 toward or away from the means 11.

Means 14 for securing the means 12 to the means 11 may comprise a triangular strip 50 of material, preferably like that of the element 21, secured just below the crest 23 and bridging the two adjacent elements and secured thereto as by welding. The lower end portions of the members 40 are secured to the strips 50 as by welding.

The modification B of Fig. 7 is of the bird-supporting means and differs from the means 10 only in shortening the distance between the major portions of the two carrying means so that the frame of Fig. 7 may accommodate birds of smaller size than the frame of the means 10 and yet be attachable to the members 40. This may be accomplished by providing an offset 55 for each carrying means-attaching portion 56, which offset extends outwardly of the major parts of the portions 56. These offsets are adapted to be engaged by the bill portions of the J-shaped bolts 45 of Fig. 6. As a consequence, the two leg-receiving portions 57 are spaced closer together than are the portions 15 of the means 10, the notches 58 spaced closer together than are the notches 19 and the wing-abutting portions 59 spaced closer together than are the portions 16.

In use, the apparatus A with either of the two frames of Figs. 1 or 7 supporting a defeathered bird C in a position substantially as shown in the drawings, is moved as a unit to, for example, a zone where the legs are removed, and deposited in the offal compartment, to another zone where the bird is opened and the viscera 60 drawn but still attached to the bird's body, and hanging above the offal compartment, while, from a zone on the other side of the apparatus, the neck is slit and the crop loosened but the head is left intact. From thence, the apparatus A may pass before an inspector who will pass or condemn the bird, as is well known in the art. Approved birds, still on the frame are then processed as by having the heart and liver cut away from the viscera and deposited in the giblet cup while, in a zone directly opposite, the head and crop are removed and slid over the surface of the opposite downwardly-sloping element 21 to reach the offal compartment, and the neck cut away and deposited in the giblet compartment. Because the gizzard generally requires further careful processing, it may be cut away at a suitable time and processed separately to be subsequently added to the other giblets at a suitable zone. Of course, minor additional process steps may be carried on, employing the apparatus A, and the contents of the offal compartment as well as that of the giblets compartment discharged by swinging the bottom walls of both to open positions by any approved means, whereupon the bottom walls will swing to closed positions.

The downwardly-diverging elements 21 provide surfaces which aid in assorting the offal and giblets and, with the dished walls at the edge portions of the elements, converge cleaning fluids toward the compartments during washing steps.

Various changes may be made to the form of invention herein shown and described without departing from the spirit of the invention or scope of the claims.

What is claimed is:

1. As an article of manufacture for use in dressing and inspection of birds, a carrying means including a pair of laterally spaced upright elongated members, a frame, having opposite ends, carried by and between said members above their lower ends, for supporting a bird in a substantially horizontal position with the head portion of the bird extending outwardly from one of said ends and the tail portion of the bird extending outwardly from the other of said ends, and a viscera support carried by said members directly below and spaced from said frame, including a tray portion comprising two upwardly and inwardly converging plates, having upper and lower ends, meeting at their upper ends and providing a crest at their upper ends extending toward said members, each plate being provided with an opening spaced from said crest and a well at and extending below the opening, one opening and well being positioned at the lower end of one plate and the other opening and well being positioned at the lower end of the other plate.

2. As an article of manufacture for use in dressing and inspection of birds, a carrying means including a pair of laterally spaced upright elongated rigid members, a frame, having opposite ends, supported upon and between said members above their lower ends, for supporting a bird in a substantially horizontal position with the head portion of the bird extending outwardly from one of said ends and the tail portion of the bird extending outwardly from the other of said ends, and a viscera support rigidly supported upon said members directly below and spaced from said frame, including a tray portion comprising two upwardly and inwardly converging plates, having upper and lower ends, meeting at their upper ends and providing a crest at their upper ends, extending toward said members, each plate being provided with an opening spaced from said crest and a well at and extending below the opening, one opening and well being positioned at the lower end of one plate and the other opening and well being positioned at the lower end of the other plate.

3. An article of manufacture for use in dressing and inspection of birds, a carrying means including a pair of laterally spaced upright elongated rigid members, a frame, having opposite ends, supported upon and between said members above their lower ends, for supporting a bird in a substantially horizontal position with the head portion of the bird extending outwardly from one of said ends and the tail portion of the bird extending outwardly from the other of said ends, a viscera support rigidly supported upon said members directly below and spaced from said frame, including a tray portion comprising two upwardly and inwardly converging plates, having upper and lower ends, meeting at their upper ends and providing a crest at their upper ends extending from one of said members to the other of said members, each plate being provided with an opening spaced from said crest and a well at and extending below the opening, one opening and well being positioned at the lower end of one plate and the other opening and well being positioned at the lower end of the other plate, and means rigidly securing said tray to said members and bracing said plates at said crest.

4. As an article of manufacture for use in dressing and inspection of birds, a carrying means including a pair of laterally spaced upright elongated rigid members, a frame, having opposite ends, supported upon and between said members above their lower ends, for supporting a bird in a substantially horizontal position with the head portion of the bird extending outwardly from one of said ends and the tail portion of the bird extending outwardly from the other of said ends, a viscera support rigidly supported upon said members directly below and spaced from said frame, including a tray portion comprising two upwardly and inwardly converging plates, having upper and lower ends, meeting at their upper ends and providing a crest at their upper ends extending from one of said members to the other of said members, each plate being provided with an opening spaced from said crest and a well at and extending below the opening, one opening and well being positioned at the lower end of one plate and the other opening and well being positioned at the lower end of the other plate, and means rigidly securing said tray to said members and bracing said plates at said crest, including a pair of upright triangular strips disposed below and in contact with said plates at said crest, one of said strips being secured to one of said members and the other of said strips being secured to the other of said members.

5. As an article of manufacture for use in dressing and inspection of birds, a carrying means including a pair of laterally spaced upright elongated members, a frame, having opposite ends, carried by and between said members above their lower ends, for supporting a bird in a substantially horizontal position with the head portion of the bird extending outwardly from one of said ends and the tail portion of the bird extending outwardly from the other of said ends, and a viscera support carried by said members directly below and spaced from said frame, including a tray portion comprising two upwardly and inwardly converging plates, having upper and lower ends, meeting at their upper ends and providing a crest at their upper ends extending toward said members, each plate being provided with an opening spaced from said crest and a well at and extending below the opening, one opening and well being positioned at the lower end of one plate and the other opening and well being positioned at the lower end of the other plate, each well being provided with an outlet of its lower end, a bottom wall normally disposed across said outlet, and means for movably closing said outlet by said bottom wall.

6. As an article of manufacture for use in dressing and inspection of birds, a carrying means including a pair of laterally spaced upright elongated members, a frame, having opposite ends, carried by and between said members above their lower ends, for supporting a bird in a substantially horizontal position with the head portion of the bird extending outwardly from one of said ends and the tail portion of the bird extending outwardly from the other of said ends, and a viscera support carried by said members directly below and spaced from said frame, including a tray portion comprising two upwardly and inwardly converging plates, having upper and lower ends, meeting at their upper ends and providing a crest at their upper ends extending toward said members, each plate being provided with an opening spaced from said crest and a well at and extending below the opening, one opening and well being positioned at the lower end of one plate and the other opening and well being positioned at the lower end of the other plate, whereby viscera hanging from the tail portion of a bird disposed upon said frame will hang toward one of said openings and one of said wells and viscera hanging from the head portion of said bird will hang toward the other of said openings and wells.

References Cited in the file of this patent
UNITED STATES PATENTS

| | | |
|---|---|---|
| 1,837,535 | Duffey et al. | Dec. 22, 1931 |
| 2,590,291 | Albright | Mar. 25, 1952 |